United States Patent Office 2,711,467
Patented June 21, 1955

2,711,467

METHOD OF PRODUCING HARD FACING WELDED DEPOSITS

Vincent T. Malcolm, Indian Orchard, Springfield, Mass., assignor to The Chapman Valve Manufacturing Company, Indian Orchard, Springfield, Mass., a corporation of Massachusetts No Drawing. Original application February 21, 1950, Serial No. 145,599. Divided and this application January 4, 1951, Serial No. 204,475

2 Claims.  (Cl. 219—10)

My invention relates to a method of producing a carbon or steel alloy steel base with hard facing alloys and this application is a divisional application of one filed by me on February 21, 1950 and given Serial Number 145,599 in the U. S. Patent Office, and now abandoned.

The principal object of my invention is directed to the provision of a novel method for providing a carbon or steel alloy object with a hard facing alloy by means of submerged automatic arc welding.

The submerged arc welding process has been found to be exceptionally valuable for the production of many types of welds. Mine is the first effort, however, to use the process for hard facing alloys.

The submerged arc welding process requires coiled wire to be used, but in order to draw the alloy into a wire and to coil the same, it must be soft and ductile. Such is not possible with the hard brittle material such as is used for hard facing. Therefore the hard facing alloy is only obtainable in short lengths of rods or electrodes and is welded to the base metal by manual methods which require special furnace equipment for preheating the base metal and for stress relieving the finished deposit.

In addition, a special technique has been required such as flowing the rod into the melting deposit and weaving it in such a way as to obtain a deposit which is free from cracks, checks, and "cobwebbing." Even with the strictest of precautions, these defects have not been entirely eliminated whereby a good, homogeneous deposit might be obtained.

In the submerged arc process, electrical energy is converted to heat and the metal wire, of a suitable construction, is converted into molten metal under a special slag, which molten metal will coalesce with the base metal and, on cooling, will result in a structurally strong, homogeneous, deposit on the base metal.

The usual welding electrode for hard facing is composed of complex alloys. In the case of most hard facing alloys, carbon is the constituent which produces the hardening effect. In this process, a brittleness of the rod results so that the metal alloy is not adaptable to being drawn into a wire for the submerged arc process.

Since arc welding can be considered as a casting formed from overheated liquid metal and then cooled to solidness, the overlay must obtain its hardness and wear resistance from the addition of carbon to the complex alloy.

Much investigative work has been carried out to determine whether wire could be drawn from complex alloys which were free from carbon so that the alloys could be drawn into wire and coiled in such a manner that the result would be adaptable to the submerged arc process. Too, much work has been carried out in alloying this complex metal with carbon when in the molten condition so that the final facing on a carbon or alloy steel base would have the required carbon content so as to produce the hardness and wear resistance necessary in the final product.

Research has been successful and as a result thereof I have determined that a complex alloy, free from carbon, can be drawn into wire, coiled, and then used in the submerged arc process by the addition of carbon into the molten metal.

The alloying is of such character as to produce in the facing a composition comparable with the original complex alloy.

According to my invention, carbon is added to a complex alloy simultaneously with welding the same to a base metal by submerged arc welding so as to provide the base with a hard facing alloy.

In carrying out my invention, various complex alloys may be used in connection with the practice of the invention. For purposes of disclosure, however, it will be described with reference to a chromium-cobalt used for hard facing made in short rods or electrodes and is of the following composition:

| | | |
|---|---|---|
| Chromium | per cent | 30.00 |
| Tungsten | do | 3.00 |
| Carbon | do | 1.10–1.60 |
| Molybdenum | do | 5.00 |
| Cobalt | | Balance |

The hardness of rod of the above composition is about 40 Rockwell "C" and is, of course, brittle and may not be formed by drawing or otherwise formed into wire adapted for coiling so as to be used in continuous length.

According to this invention, the above composition having a carbon content of not more than 0.10% is cast in a form adapted for wire drawing operations so that wire is provided with a hardness of about 18 Rockwell "C" which may be coiled for submerged arc welding operations.

In a submerged arc welding operation for providing a carbon or alloy steel base with a hard facing the wire above has been used with a melt composition including the following:

| | Per cent |
|---|---|
| Agricultural limestone | 15 |
| Titanium oxide | 15 |
| Carbon | 8 |
| Silica sand | 4 |
| Ferro molybdenum or molybdenum oxide | 11.5 |
| Linde Air Product Co. #80 melt, a composition containing calcium, magnesium, silicon, and aluminum oxides | 46.5 |

Such a melt in combination with the coilable wire having a low carbon content as described provides a hard facing of about 44 Rockwell "C" hardness.

The alloying elements of the melt may be varied to suit conditions but with the above proportions there was obtained in the deposit a carbon content of 2.14% and an 89% recovery of molybdenum.

With the above welding wire and melt, a voltage of 35 volts at 400 amperes was employed but with varying melts more or less voltage and current may be used.

From the above, it will be observed that wire suitable for coiling for use in continuous automatic submerged arc-welding is provided in combination with a melt adapted to provide a hard facing equal if not superior to that produced with non-coilable rods in connection with manual methods. Thereby the welding time is reduced so as to result in a lower cost of production.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The process of providing a base metal with a hard facing alloy by submerged arc welding consisting in, employing a wire coil having a hardness of approximately 18 Rockwell "C" and comprising a chromium-cobalt alloy of low carbon content in conjunction with a melt containing approximately 15% titanium oxide and 46.5% calcium and magnesium and silicon and aluminum oxide and approximately 15% limestone and approximately 11.5% ferro molybdenum and a balance of carbon and silica sand.

2. The process of providing a base metal with a hard facing alloy by submerged arc welding consisting in, employing a wire coil comprising a chromium-cobalt alloy in conjunction with a melt containing approximately 46.5% calcium and magnesium and silicon and aluminum oxide and approximately 15% limestone and approximately 11.5% molybdenum oxide and a balance of carbon and silica sand and titanium oxide.

References Cited in the file of this patent

UNITED STATES PATENTS

| | | |
|---|---|---|
| 2,024,992 | Wissler et al. | Dec. 17, 1935 |
| 2,191,469 | Hopkins | Feb. 27, 1940 |
| 2,226,403 | Hopkins | Dec. 24, 1940 |
| 2,280,223 | Dumpelmann | Apr. 21, 1942 |
| 2,283,916 | Comstock | May 26, 1942 |